United States Patent [19]

Shimaoka et al.

[11] Patent Number: 4,893,232
[45] Date of Patent: Jan. 9, 1990

[54] DATA MANAGEMENT SYSTEM FOR EFFICIENTLY SEARCHING DATA ELEMENTS AND HAVING A FLEXIBLE REGISTRATION ORDER OF DATA ELEMENTS

[75] Inventors: Kouichi Shimaoka; Matoi Iizuka, both of Tokyo, Japan

[73] Assignee: Kabushiki Kaisha Toshiba, Kawasaki, Japan

[21] Appl. No.: 235,617

[22] Filed: Aug. 19, 1988

Related U.S. Application Data

[63] Continuation of Ser. No. 932,677, Nov. 20, 1986, abandoned.

[30] Foreign Application Priority Data

Nov. 30, 1985 [JP] Japan .................. 60-269633

[51] Int. Cl.⁴ ................................................ G06F 1/00
[52] U.S. Cl. ...................................... 364/200; 364/300;
364/282.2; 364/283.4
[58] Field of Search ................ 364/200, 300, 900

[56] References Cited

U.S. PATENT DOCUMENTS 4,627,019 12/1986 Ng ......................................... 364/900
4,774,661 9/1988 Kumpati ............................... 364/300

Primary Examiner—Raulfe B. Zache
Attorney, Agent, or Firm—Finnegan, Henderson, Farabow, Garrett and Dunner

[57] ABSTRACT

In a data management system of this invention, data elements to be registered are managed by item information records each comprising a name of the data element, an item code corresponding to an item to which the data element belongs, and a serial number. The relation between item information records is managed by a relation information record expressed by a source item ID, an object item ID, an item code associated with a source corresponding to an item, and a relation ID indicating the relation between the source and object items. The relation ID is given by a relation table. When a search instruction is input, the item information record, the relation information record, and the relation table are referred to, thus obtaining item information to be searched. The item formation record and relation information record can be registered as needed.

24 Claims, 8 Drawing Sheets

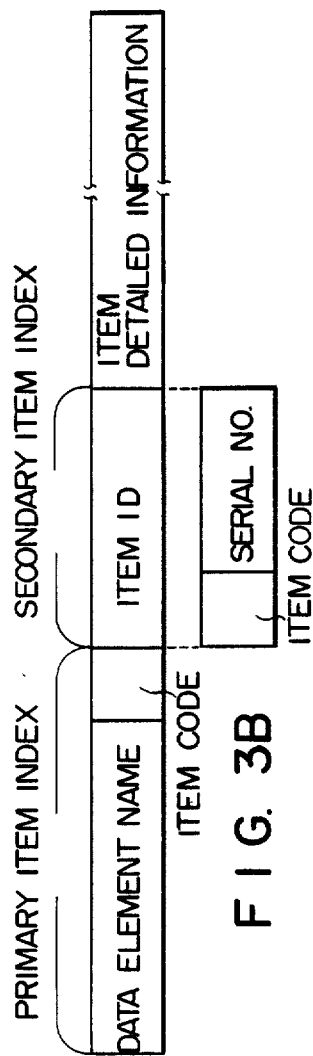
FIG. 3A
FIG. 3B
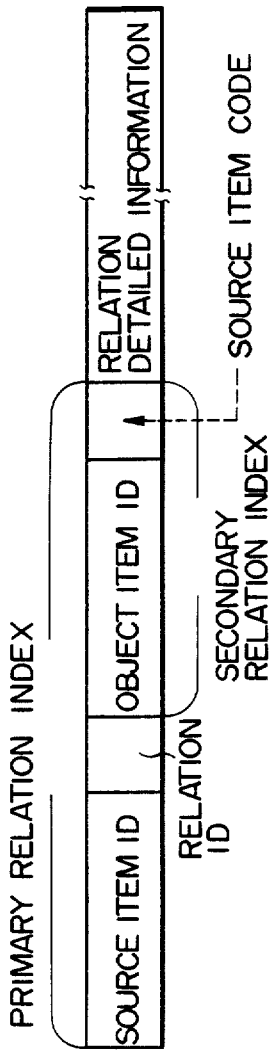
FIG. 3C

F I G. 4A | abc | JK | JK0001 | ITEM DETAILED INFORMATION

F I G. 4B | efg | JK | JK0002 | ITEM DETAILED INFORMATION

F I G. 4C | lmn | WS | WS0001 | ITEM DETAILED INFORMATION

F I G. 4D | xyz | WS | WS0002 | ITEM DETAILED INFORMATION

F I G. 5A | JK0001 | RR | WS0001 | JK | RELATION DETAILED INFORMATION

F I G. 5B | JK0001 | RR | WS0002 | JK | RELATION DETAILED INFORMATION

F I G. 5C | JK0002 | RR | WS0001 | JK | RELATION DETAILED INFORMATION

F I G. 5D | JK0002 | RR | WS0002 | JK | RELATION DETAILED INFORMATION

FIG. 6

|    | DD | IO | WS | PR | PU | LU | FL | DB | DA | RD | JK | JB | PG | AR | ND |
|----|----|----|----|----|----|----|----|----|----|----|----|----|----|----|----|
| DD | T1 |    |    |    |    |    |    |    |    |    |    |    |    |    |    |
| IO | T1 | T2 |    |    |    |    |    |    |    |    |    |    |    |    |    |
| WS | T1 |    | GS |    |    |    |    |    |    |    |    |    |    |    |    |
| PR | T1 |    |    | T2 |    |    |    |    |    |    |    |    |    |    |    |
| PU |    |    |    |    | LN | V1 |    |    |    |    |    |    |    |    |    |
| LU | T1 |    |    |    |    | T2 |    |    |    |    | RR |    | RR |    |    |
| FL |    |    |    |    |    |    | T2 |    | RR |    |    |    |    |    |    |
| DB | RR |    |    |    |    |    |    | RR | RR |    |    |    |    |    |    |
| DA |    |    |    |    |    |    |    |    |    | RR |    |    |    |    |    |
| RD | T1 |    |    |    |    |    |    |    |    |    |    |    |    |    |    |
| JK | OP | RR | RR | RR |    | RR | AC | AC |    | OP | T2 | RR | RR |    |    |
| JB |    |    |    |    |    |    |    |    |    |    |    | LC | JC |    |    |
| PG | OP | RR | RR | RR |    | RR | AC | AC | AC | OP |    |    | LC |    |    |
| AR |    |    |    |    |    |    |    |    |    |    | RR |    |    | T2 | RR |
| ND |    | V1 | V1 | V1 | RR |    | V2 | RR | V2 |    | RR | RR |    |    | T2 |

DD: DATA ITEM
IO: I/O INFORM.
WS: WORK STATION I/O INFORM.
PR: PRINT OUTPUT INFORM.
PU: PHYSICAL PATH BETWEEN NODES
LU: LOGICAL PATH BETWEEN NODES
FL: FILE
DB: DATA BASE
DA: DB AREA
RD: RECORD

JK: JOB FUNCTION
JB: JOB
PG: PROGRAM
AR: AREA
ND: NODE

RR: ITEM CORRELATION
T1: RECORD ITEM CORRELATION
T2: TREE CORRELATION
OP: PROCESSING OPERATION

AC: ACCESS SPECIFIC.
LC: LINK SPECIFIC.
JC: JOB STEP SEQ.
GS: GRAPHIC DISP. SEQ.
LN: LINE SPECIFIC.
V1: TRANSACTION VOLUME
V2: FILE VOLUME

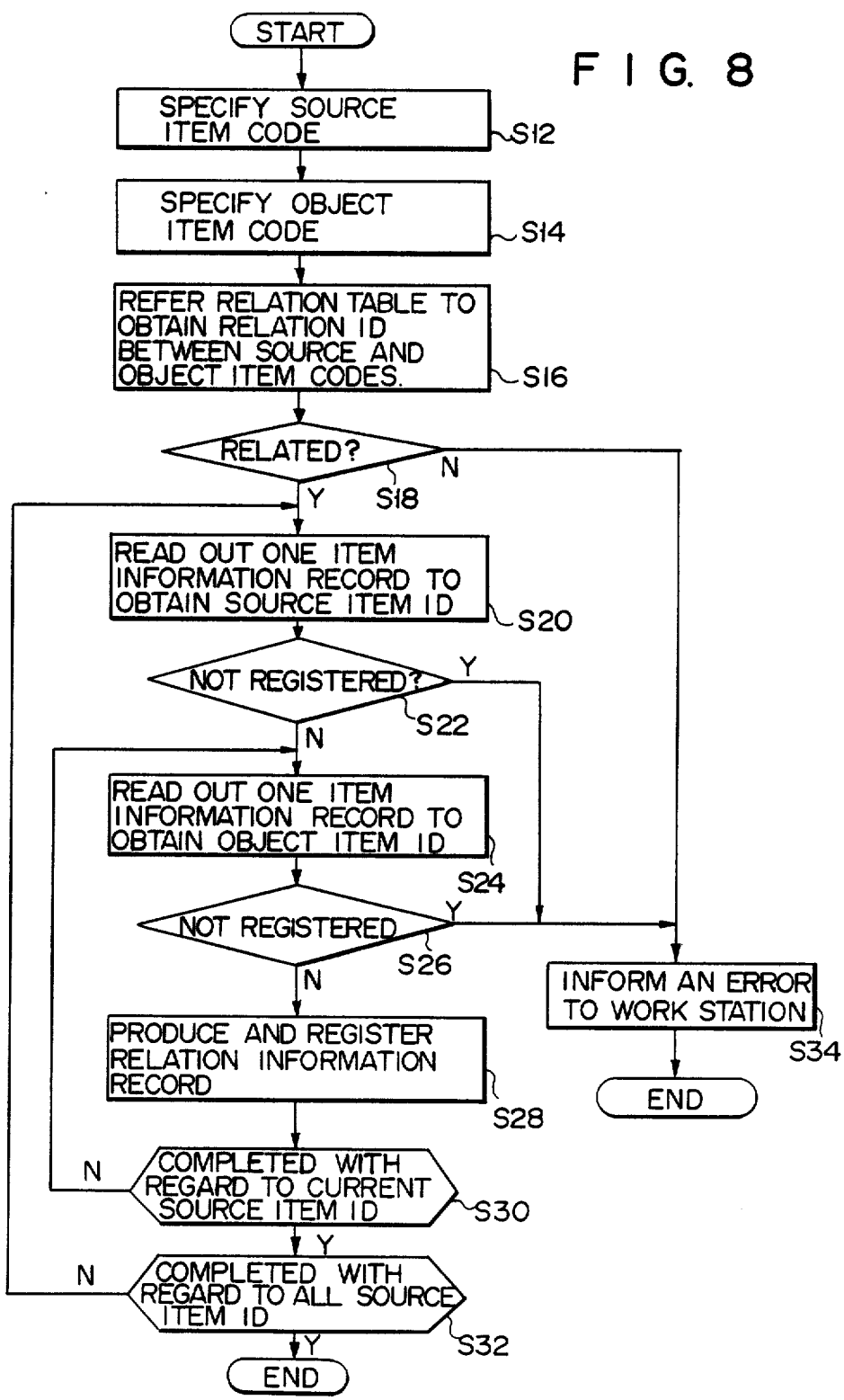

DATA MANAGEMENT SYSTEM FOR EFFICIENTLY SEARCHING DATA ELEMENTS AND HAVING A FLEXIBLE REGISTRATION ORDER OF DATA ELEMENTS

This application is a continuation of application Ser. No. 932,677, filed Nov. 20, 1986, now abandoned.

BACKGROUND OF THE INVENTION

The present invention relates to a data management system suitable for creating and managing various databases.

Conventionally, a data dictionary/directory (DD/D) is adopted as a database management system. The DD/D manages a data item appearing on a database as a core of a data system and its attribute, accumulates "metadata", and generally performs system operations and maintenance support. However, since a complex "relation" between various data elements cannot be expressed by the DD/D, it is difficult to search data elements and items having a relation therebetween.

As a means for expressing the "relation" between data elements, a relational database (RDB) using a relation model has been proposed. However, in order to express the relation with the RDB, a "table" must be created, and matching processing during a search operation takes a great deal of time. In addition, in order to update one record, n records must be updated.

Alternatively, as a means for expressing the "relation" between data elements, a COOASYL (an acronym for Conference For Data Systems Languages) type database is known. However, in a database of this type, a registration order of the data elements is fixed, and arbitrary data elements cannot be registered as needed, or data elements cannot be related after they are registered.

SUMMARY OF THE INVENTION

The present invention has been made in consideration of the above situation and has as its object to provide a data management system which can efficiently search item information associated with a data element.

The data management system comprises item information file means for storing a plurality of item information records, each showing a state for a data element belonging to an item, the item information file means being accessed by an item index using a part of the stored item information; relation table storing means for storing a relation table in which information indicating a relation between items is registered; relation information file means for storing a plurality of relation information records, each showing a relation between source and object data elements, the relation information file means being accessed by a relation index using a part of the stored relation information, and search means for obtaining item information for a data element to be searched, by accessing the item information file means using the item index in order to obtain the item information for source and object data elements to be searched, by accessing the relation table storing means in order to obtain the information indicating the relation, and by accessing the relation information file means using the relation index in order to obtain the relation information, in accordance with an input search instruction.

In addition to the above object, it is another object of the present invention to provide a data management system in which the registration order of data elements is not fixed, a data element can be registered regardless of an item to which the data element should belong when data element registration is necessary, and data elements can be easily related as needed.

The data management system further comprises:

relation information record registering means for forming, in accordance with an input relation information record registering instruction, relation information records from yet unrelated item information records in items specified by the relation information record registering instruction, and for registering the formed relation information records in the relation information file means, and item information record registering means for forming, when a data element is registered, an item information record for the data element, and for registering the formed item information record in the item information file means.

It is still another object of the present invention to provide a search method capable of efficiently managing a database.

The search method comprises registering a data element in the database and an item information, indicating a registered state of the data element and generated upon registration, as an item information record in an item information file;

relating yet-unrelated item information records to one another, respectively belonging to designated items, using a relation table indicating relations between items to produce a relation information record indicating a relation between data elements, resulting in registration of the relation information record in a relation information file;

searching the item information to be searched, by referring to the relation table, the item information file, and the relation information file in accordance with an input search instruction.

According to the data management system of the present invention, the registration order of data elements will not be fixed, and design data and the relation between the design data can be desirably input like a design memo, e.g., in the design and manufacture of a software system. Therefore, a flexible design procedure which can deal with clear design data first and then unclear design data can be supported. When a necessary data element is to be searched, a search operation is performed by utilizing a relation table between data elements in addition to the relation information record and the item information record, so that design contradiction, lack of design data, design data which requires further decision, and the like can be inquired and verified. In addition, high-grade design data can be reliably transmitted to and re-utilized for lower-grade design.

BRIEF DESCRIPTION OF THE DRAWINGS

FIG. 3A shows a format of an item information record, FIG. 3B shows a format of an item identification in the item information record shown in FIG. 3A, and FIG. 3C shows a format of a relation information record;

FIGS. 4A to 4D are examples of item information records;

FIGS. 5A to 5D are examples of relation information records;

FIG. 6 is a relation table used in this embodiment;

FIG. 8 is a flow chart for explaining the operation for creating a relation information record in the embodiment shown in FIG. 1.

PREFERRED EMBODIMENT OF THE INVENTION

A data management system according to an embodiment of the present invention will be described in detail with reference to the accompanying drawings.

Figure 1:
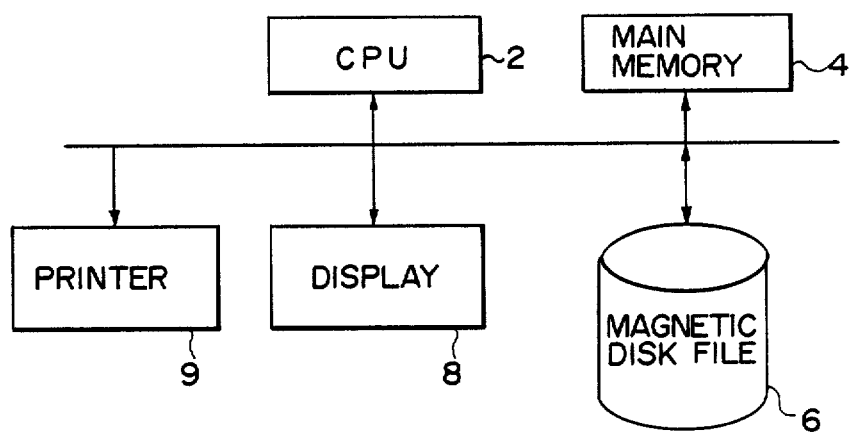
FIG. 1 is a block diagram of a data management system according to an embodiment of the present invention.

The arrangement of a system according to this embodiment will be described with reference to FIG. 1. The system of this embodiment comprises a CPU 2 for controlling the entire system and executing search processing, and the like, a main memory 4 for temporarily storing necessary data, a magnetic disk file 6 for storing data elements, item information records, relation information records, relation table, and the like, a display unit 8 for displaying a searched result, and a printer 9.

Figure 2:
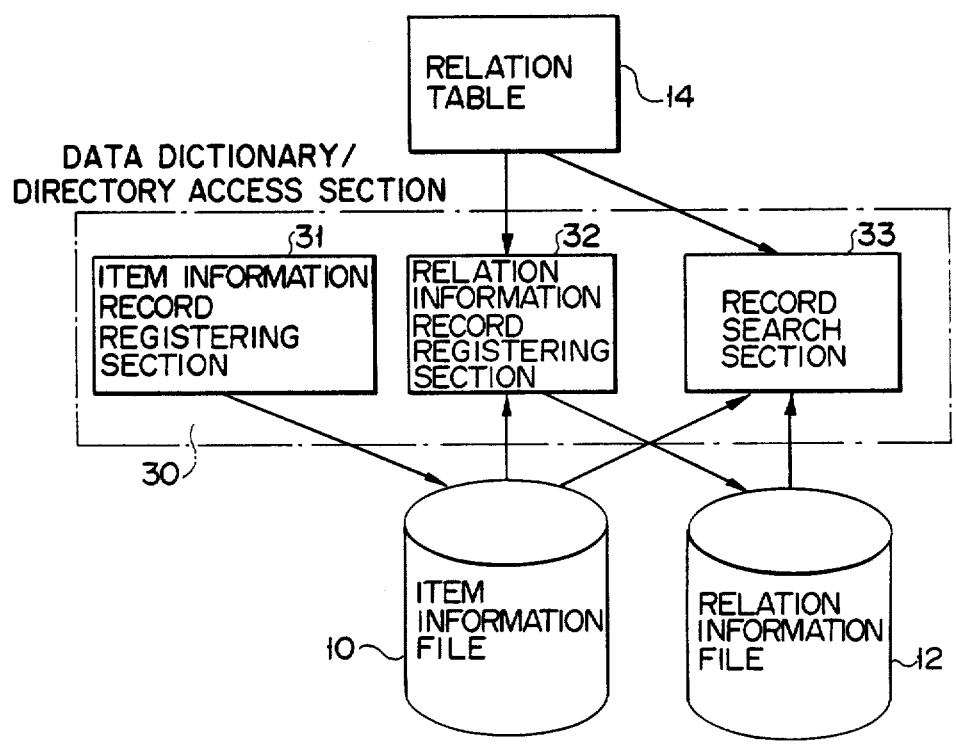
FIG. 2 is a function block diagram for explaining the operation of the system shown in FIG. 1.

The operation of the data management system will be described with reference to FIG. 2, showing the characteristic features of the present invention as function blocks.

Referring to FIG. 2, the data management system comprises two index files, i.e., an item information file 10 for storing item information records and a relation information file 12 for storing relation information records, a DDD (design data dictionary) access section 30 for accessing files 10 and 12, and a relation table 14 showing the relation between items to which data elements (in this embodiment, design data) belong.

The item information record stored in item information file 10 has a format shown in FIG. 3A. The item information record consists of a primary item index, a secondary item index, and item detailed information. In the primary index, a data element name and an item code corresponding to an item to which the data element belongs are written. In the secondary item index, an item identification (ID) is written. The item ID consists of the item code and a serial number, as shown in FIG. 3B. The serial number indicates a registration number when a newly input data element is registered in an item indicated by the corresponding item code.

FIG. 3C shows the format of the relation information record stored in relation information file 12. The relation information record consists of a primary relation index and relation detailed information. The primary relation index consists of a source item ID, a relation identification (ID), an object item ID, and a source item code. The combination of the source item ID and the source item code is referred to as a secondary relation index.

DDD access section 30 comprises an item information record registering section 31 for registering the item information record in item information file 10, a relation information record registering section 32 for reading out the item information record from file 10, generating a relation information record using relation table 14, and registering it in relation information file 12, and a record search section 33 for executing search processing using files 10 and 12 and table 14.

For example, when a currently processed data element is to be registered as a part of a database, an item to which the data element should belong is specified. As shown in FIG. 3B, an item ID consisting of an item code corresponding to the specified item and a serial number is generated. The data element, when the registration is specified, is stored in accordance with the item ID. At this time, the item information record shown in FIG. 3A is generated and is registered in file 10.

FIGS. 4A to 4D show item information records registered in file 10 as described above. FIG. 4A shows an item information record in which a data element name is "abc", an item code is "JK", an item ID is "JK0001" and, thereafter, item detailed information is written. For example, if the item code is "JK", the item detailed information indicates a job for every day or for once a month.

FIGS. 4B to 4D show item information records in which data element names are "efg", "lmn", and "xyz", item codes are "JK", "WS", respectively, and "WS", and item IDs are "JK0002", "WS0001", and "WS0002", respectively.

In the item information record shown in FIG. 4B, since one data element belonging to item "JK" has already been shown, the new item ID is "JK0002". This also applies to the item information records shown in FIGS. 4C and 4D.

The registration order of the item information records is not predetermined in accordance with item codes or the relation between item information records. Therefore, the item information record is registered when the item ID is generated, i.e., when a data element is to be registered.

The item information records registered in file 10 as described above can be read out by a primary item index or a secondary item index. At this time, when item information is to be searched using the primary item index, if its item code is unknown but a data element name is known, it can be searched. In this case, the item ID, i.e., an item code and a serial number, is treated as one data. This also applies to the primary and secondary relation indexes.

The procedure for generating a relation information record using the registered item information records will be explained with reference to FIG. 8. In this case, relation table 14 stores a table shown in FIG. 6. In this table, source items are shown using item codes in a longitudinal column, object items are shown using item codes in a horizontal column, and relation IDs showing the relation between items are shown in columns at intersections of these source and object items. For example, if the source item code is "JK" and the object item code is "WS", a relation ID indicating the relation therebetween is represented by "RR".

Item codes "DD", "IO", "WS", "PR", "PU", "LU", "FL", "DB", "DA", "RD", "JK", "JB", "PG", "AR", and "ND" respectively indicate a data item, I/O information, work station I/O information, print output information, a physical path between nodes, a logical path between nodes, a file, a database, a DB area, a record, a job function, a job, a program, an area, and a node.

Relation IDs "RR", "T1", "T2", "OP", "AC", "LC", "JC", "GS", "LN", "V1", and "V2" respectively indicate an item correlation, a record item correlation, a tree correlation, a processing operation, access specification, link specification, a job step sequence, a graphic display sequence, line specification, a transaction volume, and a file volume.

Figure 7:
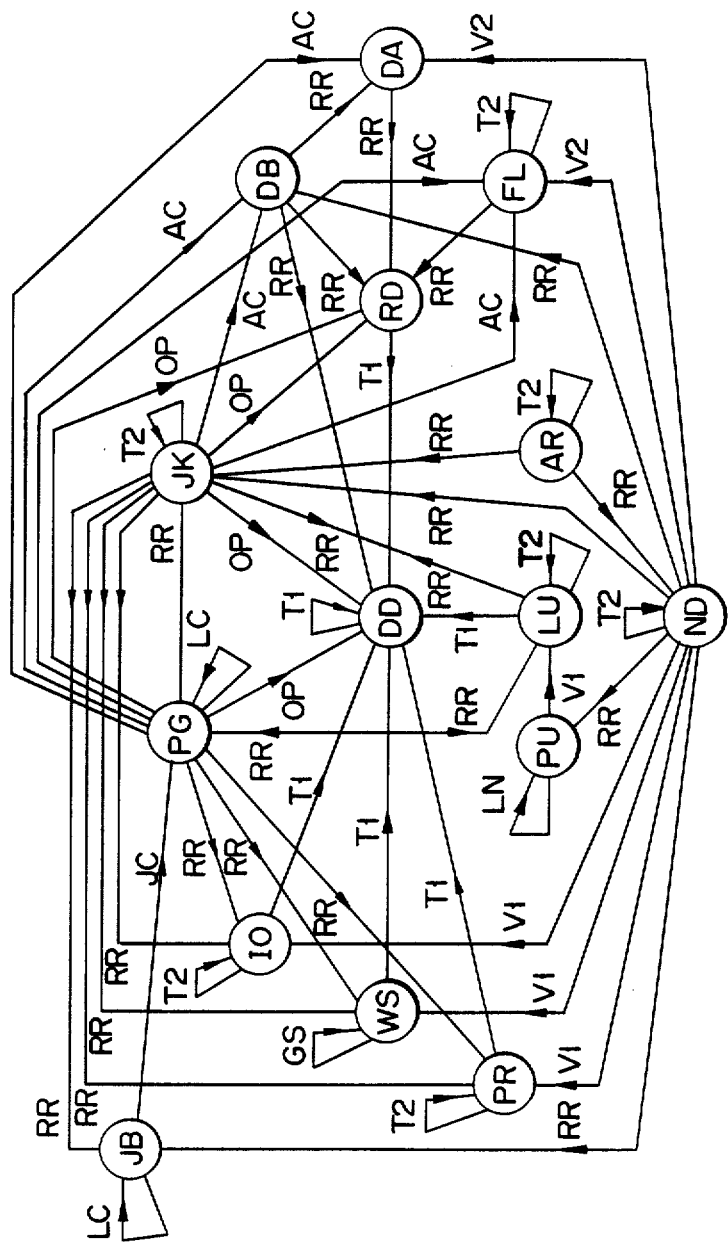
FIG. 7 is a diagram showing the connection relation between items shown in FIG. 6.

FIG. 7 shows the connection relations on the basis of the relation table shown in FIG. 6.

A source item code, e.g., "JK", is specified in step S12 in FIG. 8, and an object item code, e.g., "WS", is specified in step S14. Thereafter, registering section 32 refers to relation table 14 in order to check the relation between the input source and object item codes in step S16. As a result, as can be seen from FIG. 6, relation ID "RR" is obtained as their relation.

For example, if a source item code, e.g., "RD" is specified in step S12, and an object item code, e.g., "WS", is specified in step S14, since no relation therebetween is present, no relation ID is obtained in step S16.

Step S18 determines if the relation ID is obtained. If no relation ID is obtained, the flow advances to step S34; and error processing for informing a specification error, and the like, is executed. If the relation ID is obtained, i.e., if Y in step S18, the flow advances to step S20.

In step S20, a primary item index is obtained from the specified source item code, and item information file 10 is referred to in accordance therewith. Thus, an item ID which includes the source item code specified in step S12 and is not related is obtained from the referred item information record.

Since "JK" is selected as the item code, item ID "JK0001" is obtained first from the item information record shown in FIG. 4A as a source item ID. At this time, if no corresponding item ID is present, Y is obtained in step S22, and the flow advances to step S34 to perform error processing. If the corresponding item information record is present, N is obtained in step S22, and the flow advances to step S24.

Since "WS" is selected as the object item code, item ID "WS0001" is obtained first from the item information record shown in FIG. 4C as the object item ID.

After execution of step S24, the same determination as in step S22 is made. If an object item ID is present, N is obtained in step S26, and the flow advances to step S28. If no object item ID is present, Y is obtained in step S26, and the flow advances to step S34.

A relation information record shown in FIG. 5A is formed based on obtained source item ID "JK0001", relation ID "RR", object item ID "WS0001", object item code "K", and the item detailed information in accordance with the format shown in FIG. 3C, and is registered in relation information file 12.

Step S30 then determines if an unprocessed object item ID having item code "WS" is present with regard to "JK0001" read out as a current object item ID. If the determination in step S30 is Y, step S32 is executed. However, if the determination is N in step S30, step S24 is executed again.

In this embodiment, since item ID "WS0002" corresponding to the item information record shown in FIG. 4D is present as an unprocessed object item ID having object item code "WS", step S24 is executed.

In step S24, the item information record shown in FIG. 4D is read out in the same manner as described above, and "WS0002" is obtained as an object item ID.

Thereafter, step S28 is executed through step S26, and the relation information record shown in FIG. 5B is formed and registered in file 12. At this time, since no unprocessed item information record having "JK" as a source item code is present, Y is obtained in step S30, and the flow advances to step S32.

In step S32, the same determination as in step S30 is made. More specifically, step S32 determines if an unprocessed item information record having "JK" as a source item code is present. If it is present, N is obtained in step S32, and the flow returns to step S20.

In step S20, one of the remaining specified information records having source item code "JK" is read out. In this case, the item information record shown in FIG. 4B is read out. An object item information record to be related to this record is read out in step S24. In this case, the item information record shown in FIG. 4C is read out. In step S28, the two item information records are related in the same manner as described above. As a result, the relation information record shown in FIG. 5C is formed, and is registered in relation information file 12.

After relating of the item information record shown in FIG. 4C is completed, step S30 determines if an unprocessed object item information record is present. In this case, since the unprocessed item information record shown in FIG. 4D is present, step S24 is again executed to read out the item information record shown in FIG. 4D.

In step S30, the item information records shown in FIGS. 4B and 4D are related. As a result, the relation information record shown in FIG. 5D is formed, and is stored in file 12.

Thereafter, step S32 determines if an unprocessed source item information record is present. Since no unprocessed item information record is present, Y is obtained in step S32, and relating processing ends.

With the above processing, the item information records shown in FIGS. 4A to 4D are registered in file 10, and the relation information records shown in FIGS. 5A to 5D are registered in file 12.

The above-mentioned relating processing can be desirably performed using relation table 14 as needed.

Figure 9A:
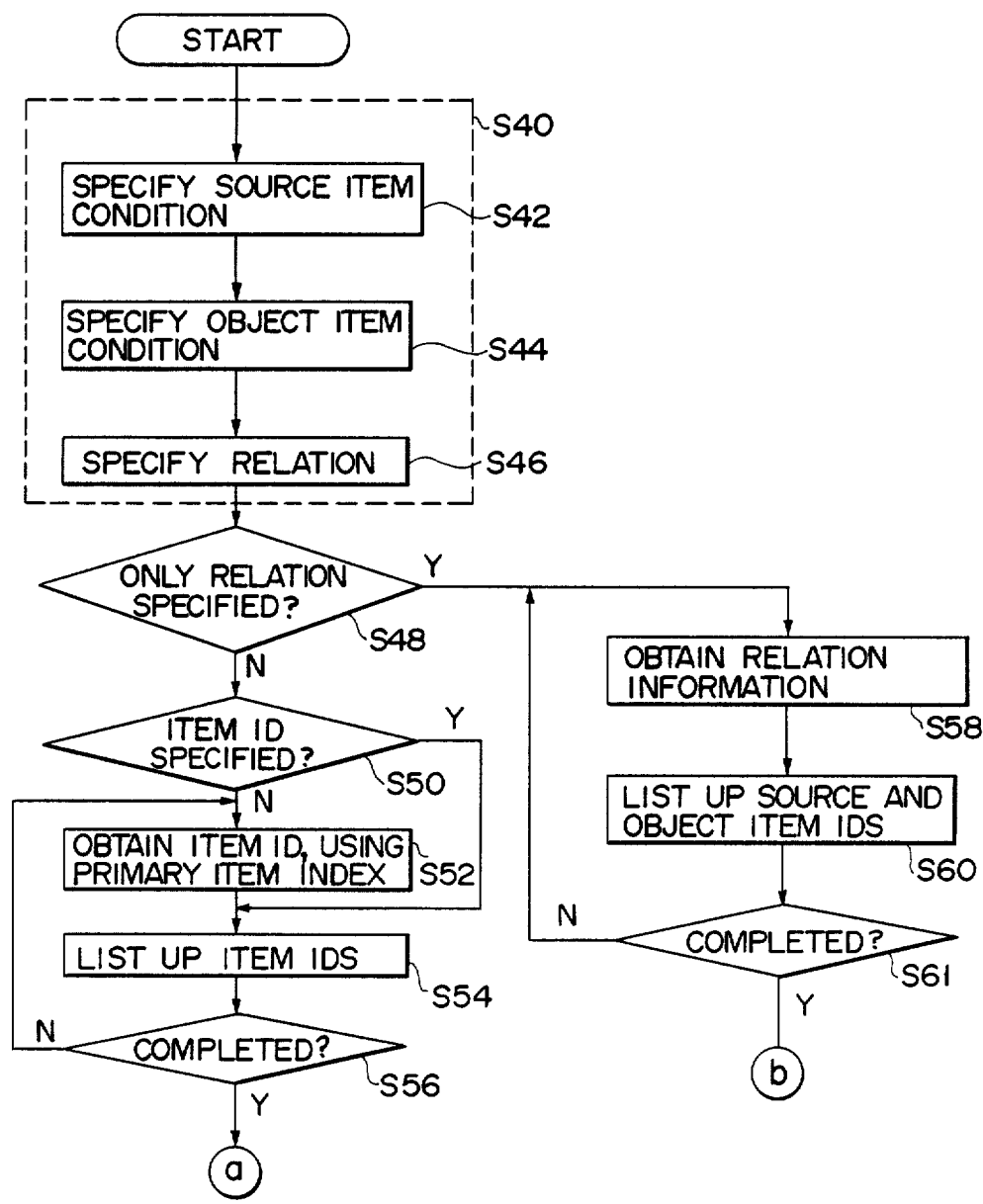
FIGS. 9A and 9B are flow charts for explaining the operation for searching item information associated with a data element in the embodiment shown in FIG. 1.
Figure 9B:
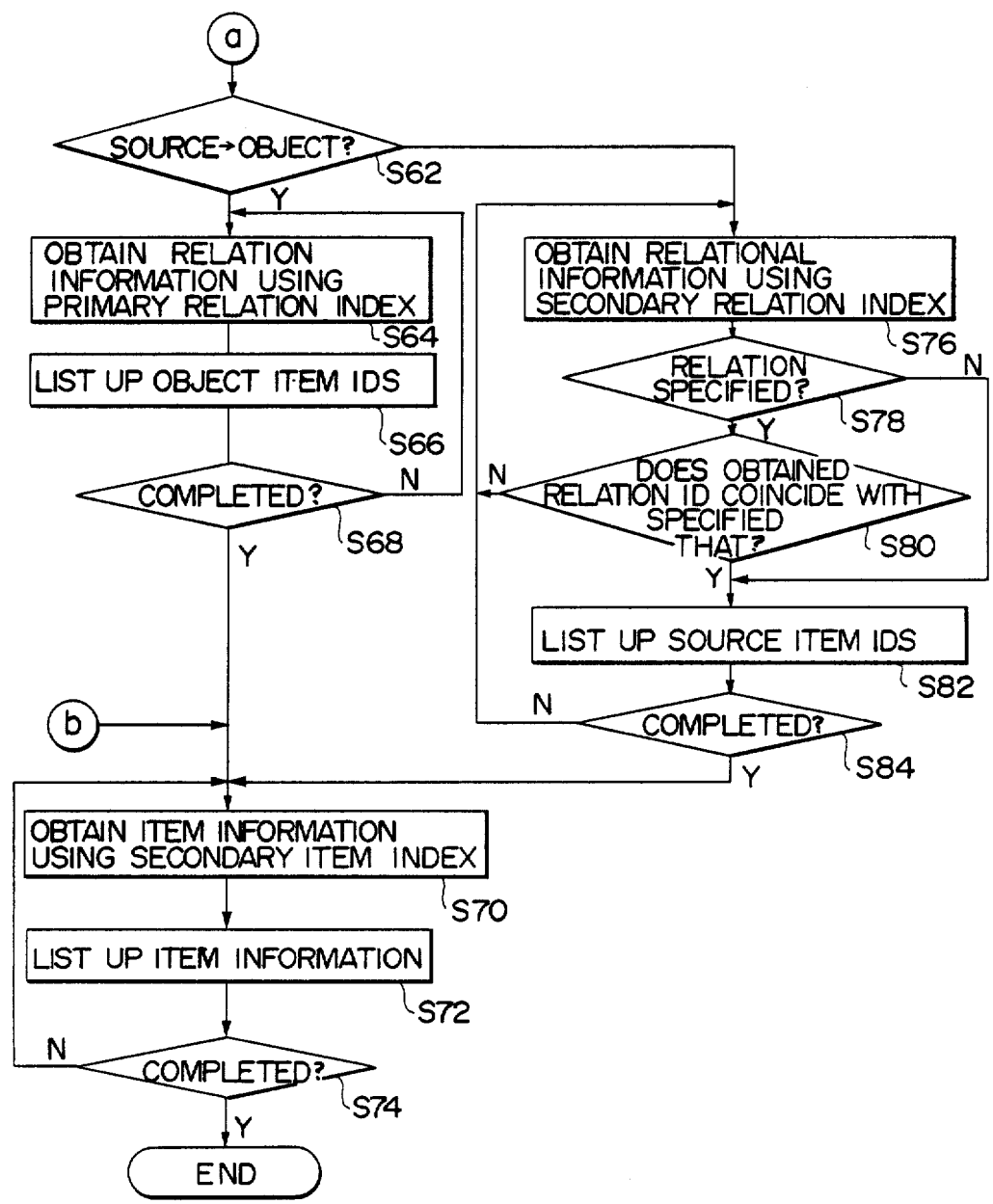

Search processing for obtaining item information for searching a necessary data element will be described in detail with reference to FIGS. 9A and 9B.

The search processing can be classified into (1) processing for obtaining object information from source information and a relation, (2) processing for obtaining source information from object information and a relation, and (3) processing for obtaining source and object information from a relation.

Processing (1) can be further classified as (1-a) search processing using a specific source item and a specific relation, (1-b) search processing using a specific source item and an arbitrary relation, (1-c) search processing using a specific source data element, and a specific relation, and (1-d) search processing using a specific source data element and an arbitrary relation.

Similarly, processing (2) can be further classified to (2-a) search processing using a specific object item and a specific relation, (2-b) search processing using a specific object item and an arbitrary relation, (2-c) search processing using a specific object data element and a specific relation, and (2-d) search processing using a specific object data element and an arbitrary relation.

The search processing using the arbitrary source information and the specific relation and the search processing using the arbitrary object information and the specific relation are the same as processing (3).

The above-mentioned search processing will be explained in detail with reference to FIGS. 9A to 9B.

First, in step S40 (steps S42 to S46), search conditions are input, and a search instruction is generated. More specifically, in step S42, a source item condition is input. If the input item condition is not an item code but a source data element, it is determined whether the item ID of the corresponding data element has been obtained. If no item ID is obtained, an item ID corresponding to a specified data element is determined from file 10.

In step S44, an object item condition is input. If the input item condition is not an item code but an object data element, it is determined whether the item ID of the data element has been obtained. If no item ID is obtained, an item ID corresponding to the specified data element is determined from file 10.

In step S46, a relation is specified. In this case, it is determined whether a relation ID is specified. If no relation ID is specified, a relation ID is determined from relation table 14.

In step S40, step S42 is executed for search processing (1) and is passed for other search processing. Step S44 is executed for search processing (2) and is passed for other processing. Step S46 is executed for processing (1-a), (1-b), (2-a), (2-b), and (3) and is passed for other processing.

After the search conditions are determined and the search instruction is generated, in step S48 determines if the search processing using only the relation, i.e., search processing (3) is to be executed. If Y in step S48, the flow advances to step S58. However, if N in step S48, step S50 is executed.

Step S50 determines if an item ID is already specified, i.e., if a data element is specified. If N in step S50, the flow advances to step S52, and item information is extracted using a primary item index from the input item code. Thereafter, an item ID is extracted from the readout item information and is entered into a list in step S54. (This step is abbreviated as "LIST UP ITEM IDS" in FIG. 9A). If the data element is specified, Y is determined in step S50, and step S54 is directly executed.

Thereafter, step S56 is executed to determine if item IDs of all the data elements belonging to the specified item are obtained. If Y in step S56, the flow advances to step S62. However, if N in step S56, the flow returns to step S52. When the data element is specified, step S54 is executed once. When the item is specified, step S54 may be executed a number of times.

With the above processing, in, e.g., search processing (1-a) in which "JK" is specified as the source item, item IDs "JK0001" and "JK0002" are obtained. In search processing (2-a) in which "WS" is specified as the object item, item IDs "WS0001" and "WS0002" are obtained.

After the item IDs are obtained, it is determined in step S62 if search processing (1) or (2) is to be executed. In the case of search processing (1), Y is determined in step S62 and step S64 is then executed.

In the case of search processing (2), N is obtained in step S62 and step S76 is executed.

In step S64, file 12 is accessed using the primary relation index from the previously obtained source item ID, e.g., "JK0001" and relation ID, e.g., "RR" obtained in step S46, thus reading out a relation information record. For example, the relation information record shown in FIG. 5A is first read out, and "WS0001" is obtained as an object item ID. The obtained object item IDs are entered into a list in step S66. Thereafter, the completion of processing is checked in step S68. If Y in step S68, step S70 is executed. However, if N in step S68, step S64 is executed again, and a next object item ID, e.g., "WS0002" is obtained. In this manner, object item IDs "WS0001" and "WS0002" are obtained in correspondence with source item ID "JK0001".

After detection of the object item IDs, file 10 is accessed using the secondary item index in accordance with the obtained object item IDs, thus reading out an item information record. For example, the item information record shown in FIG. 4C is read out in accordance with object item ID "WS0001". The readout item information records are entered into a list in step S72. Thereafter, in step S74, the completion of the processing is checked. If Y in step S74, the search processing ends. If N in step S74, step S70 is executed again and the item information record shown in FIG. 4D is obtained with reference to object item ID "WS0002".

In this manner, search processing (1) ends. In the case of search processing (1-b), i.e., when a relation is not specified, in step S64, file 12 can be accessed using only the item ID without using a relation ID when search processing is performed using the primary relation index.

In the case of search processing (1-c), i.e., when a data element, not an item, is specified, Y is determined in step S50.

When the source item information is to be obtained from the object item ID, the processing is performed using the object item IDs, e.g., "WS0001" and "WS0001" obtained in step S54.

In step S76, the relation information record is read out using the secondary relation index in accordance with the object item ID. The relation information record shown in FIG. 5A is read out in accordance with object item ID "WS0001".

Step S78 then determines if a relation is specified. If Y in step S78, step S80 is executed. If N in step S78, step S82 is executed. Step S80 determines if the relation ID in the relation information record read out in step S76 coincides with a specified relation ID. If "RR" was specified as the relation ID, since the relation ID shown in FIG. 5C is "RR", Y is obtained in step S80, and step S82 is executed. If N in step S80, i.e., if the specified relation ID does not coincide with the relation ID in the readout relation information record, the readout relation information record is ignored, and step S76 is executed again.

In step S82, source item IDs are entered into a list. For example, source item ID "JK0001" corresponds to object item ID "WS0001".

Thereafter, the completion of the processing is checked in step S84. If Y in step S84, step S70 is executed. If N in step S84, step S76 is executed again.

In addition, source item ID "JK0002" is obtained in correspondence with source item ID "WS0001", and source item IDs "JK0001" and "JK0002" are obtained in correspondence with item ID "WS0002", in the same manner as described above.

The same processing is performed after step S70. In this manner, search processing (2) is executed. In the case of search processing (2-a), i.e., if a relation is specified, N is determined in step S78. If an object data element is specified, Y is obtained in step S50.

If Y in step S48, i.e., if only the relation is specified, relation information is read out using a primary relation index in accordance with the relation ID. In step S60, source item IDs and object item IDs are listed up from the readout information records. Thereafter, the completion of the processing is checked in step S61. If Y in step S61, step S70 is executed. If N in step S61, step S58 is again executed and the next relation information record is read out.

The same processing is performed after step S70.

As described above, in the data management system of the present invention, a data element can be efficiently searched. In the above embodiment, two-dimensional relating has been explained. However, the present invention can also be applied to relate other dimensions.

What is claimed is:

1. A data management system for efficiently searching item information for a data element, comprising:
   item information file means for storing a plurality of item information records, each showing a state of a data element belonging to an item, said item information file means being accessed by an item index using a part of a stored item information record;
   relation table storing means for storing a relation table in which information indicating a relation between items is registered;
   relation information file means for storing a plurality of relation information records, each showing relation information between source and object data elements, said relation information file means being accessed by a relation index using a part of a stored relation information record; and
   search means, connected to said item information file means, said relation table storing means, and said relation information file means, for obtaining item information for a data element to be searched, by accessing said item information file means using the item index in order to obtain the item information for source and object data elements to be searched, by accessing said relation table storing means in order to obtain the information indicating the relation, and by accessing said relation information file means using the relation index in order to obtain the relation information, in accordance with an input search instruction.

2. The system according to claim 1, wherein an item information record comprises a name of a data element, an item code corresponding to an item to which the data element belongs, and a serial number indicating a storage order of the data element in the item, the item index comprising a primary item index and a secondary index, the primary item index including the name of the data element and the item code, and the secondary item index including an item identification formed by the item code and the serial number, and
   said search means includes item search means, connected to said item information file means, for searching, when said item information file means is accessed in accordance with the input search instruction, an item information record in accordance with a specified one of the primary item index and the secondary item index.

3. The system according to claim 1, wherein said relation table has the information indicating the relation between items, expressed in a form of a relation identification corresponding to the relation, and
   a relation information record comprises the relation identification, a source and an object item identification for a source and an object data element, and a source item code for the source data element, the source item code corresponding to an item to which data element belongs, the source and object item identifications each being formed by the item code and a serial number indicating a storage order of the data element in the item, the relation index including a primary relation index and a secondary relation index, the primary relation index including a source item identification, the relation identification, an object item identification, and a source item code, and the secondary relation index including an object item identification and a source item code, and
   said search means includes relation search means, connected to said relation information file means, for searching, when said relation information file means is accessed in accordance with the input search instruction, a relation information record in accordance with a specified one of the primary relation index and the secondary relation index.

4. The system according to claim 1, wherein an item information record comprises a name of the data element, an item code corresponding to an item to which the data element belongs, and a serial number indicating a storage order of the data element in the item, the item index including a primary item index and a secondary item index, the primary item index including a name of the data element and the item code, and the secondary item index including an item identification comprising the item code and the serial number,
   said relation table has the information indicating the relation between items, expressed in a form of a relation identification corresponding to the relation, and
   a relation information records comprises an item code for a source data element, the relation identification, and source and object item identifications for the source and object data elements, the relation index including a primary relation index and a secondary relation index, the primary relation index including a source item identification, the relation identification, an object item identification, and a source item code, and the secondary relation index including an object item identification and a source item code.

5. The system according to claim 4, wherein said search means comprises:
   item search means, connected to said item information file means, for searching the item information using a specified one of an input primary item index and an input secondary item index when said item information file means is accessed in accordance with the input search instruction;
   relation referring means, connected to said item information file means, for searching the relation identification using an input information indicating the relation when said relation table storing means is accessed in accordance with the input search instruction;
   relation search means, connected to said item information file means, for searching the relation information using a specified one of an input primary index and an input secondary relation index when said relation information file means is accessed in accordance with the input search instruction; and
   control means for controlling said item search means to obtain the item identification for a data element as the source in search, for controlling said relation referring means to obtain the relation identification, for controlling said relation search means to obtain the relation information and for controlling said item search means to obtain object item information for a data element as the object, in accordance with the input search instruction.

6. The system according to claim 5, wherein said control means comprises at least one of:
   means for controlling said item search means to obtain a source item identification, for controlling said relation referring means to obtain the relation identification for a given relation, and for controlling said relation search means to obtain the relation information, and for controlling said item search means to obtain object item information for an object data element again, when the input search instruction is to search for object item information from a source item information;
   means for controlling said item search means to obtain the object item identification, for controlling said relation referring means to obtain the relation identification for a given relation, for controlling said relation search means to obtain the relation information, and for controlling said item search means to obtain the item information for the source data element again, when the input search instruction is to search for source item information from an object item information; and
   means for controlling said relation referring means to obtain the relation identification, for controlling said relation search means to obtain the source and object item identifications from the relation information, and for controlling said item search means to obtain the item information, when the input search instruction is to search for source and object item information from a given relation.

7. The system according to claim 5, wherein said control means includes processing control means for controlling a processing order such that a series of search processing for obtaining the item information for one data element is completed and, thereafter, a series of search processing for a next data element is executed.

8. The system according to claim 5, wherein said control means includes processing control means for controlling a processing order, when at least one of said item search means, said relation referring means, and said relation search means is controlled at least once, and for continuing to control the processing order until processing for the input search instruction is completed.

9. The system according to claim 4, further comprising relation information record registering means, connected to said relation information file means, for forming, in accordance with an input relation information record registering instruction, relation information records from yet-unrelated item information records in the items specified by the relation information record registering instruction, and for registering the formed relation information records in said relation information file means.

10. The system according to claim 9, further comprising item information record registering means, connected to said item information filing means, for forming, when a data element is registered, an item information record for the data element, and for registering the formed item information record in said item information file means.

11. The system according to claim 1, further comprising relation information record registering means, connected to said relation information file means, for forming, in accordance with an input relation information record registering instruction, relation information records from yet-unrelated item information records in the items specified by the relation information record registering instruction, and for registering the formed relation information records in said relation information file means.

12. A method for managing a database comprising the steps, performed by a data processing system, of:
   registering a data element in the data base and an item information, indicating a registered state of the data element and generated upon registration, as an item information record in an item information file;
   relating yet-unrelated item information records to one another, respectively belonging to designated items, using a relation table indicating relations between items to produce a relation information record indicating a relation between data elements, resulting in registration of the relation information record in a relation information file;
   searching the item information to be searched, by referring to the relation table, the item information file, and the relation information file in accordance with an input search instruction.

13. The method according to claim 12, wherein the item information includes a serial number indicating a registration order of a data element in a designated item, and the item information is registered in the item information file using the serial number, and thereby are registered at any time when registration is desired and regardless of already-registered data elements.

14. The method according to claim 12, wherein the relation information records are independent from each other and are referred to using a part of the item information for a data element, and thereby are registered at any time when relating is desired and regardless of already-registered relation information records.

15. The method according to claim 12, wherein the item information record is registered in a first predetermined format.

16. The method according to claim 15, wherein the first predetermined format comprises a name of the data element, an item code corresponding to an item to which the data element belongs, and a serial number.

17. The method according to claim 12, wherein the relation information record is registered in a second predetermined format.

18. The method according to claim 17, wherein the second predetermined format comprises a relation identification, source and object item identifications, and source item code, the relation identification corresponding to a relation between items to which source and object data elements belong respectively, the item identification being formed by the item code, corresponding to an item to which a data element belongs, and a serial number indicating the storage order of the data element in the item, source and object item identifications being item identification for source and object data elements.

19. A data management system for efficiently searching at least one object data element, comprising:
   item information file means for storing item information records, each including an item index for managing a data element, the item index including an item identification designating the data element;
   relation information file means for storing relation information records, each including a relation index for representing a relation between two data elements, the relation index including the item identifications of the two data elements; and search means, connected to the item information file means and the relation information file means, and responsive to an input search instruction, for determining whether the search instruction includes a source data element item identification to obtain the source data element item identification, and for searching said relation information records for at least one object data element item identification in accordance with said obtained source data element item identification to obtain at least one data element item identification in accordance with said at least one object data element item identification.

20. A system according to claim 19, wherein said item identification includes an item code representing an item to which the data element belongs and a serial number representing an order in which the data element is registered in the item, wherein the item index further includes a data element name, and wherein said search means further comprises, when the search instruction includes a source data element name in place of said source data element item identification, means for searching said item information records for said source data element item identification in accordance with said source data element name to obtain said source data element item identification.

21. A system according to claim 19, wherein said search means further comprises:
means for determining whether the search instruction further includes a specified relation identification to obtain said specified relation identification; and
means for searching said relation information records for said at least one object data element item identification in accordance with said obtained specified relation identification while confirming that each relation information record includes said source data element item identification and said specified relation identification, the relation index further including a relation identification.

22. A system according to claim 21, further comprising:
a relation table for storing relation identifications each representing a relation between two items, and wherein said search means further comprises:
means for referring to said relation table in accordance with a specified relation to obtain said specified relation identification, when the search instruction includes the specified relation.

23. A system according to claim 19, wherein said search means further comprises:
means for determining whether the input search instruction includes only a specified relation identification to obtain said specified relation identification; and
means for searching said relation information records for said at least one object data element item identification in accordance with said obtained specified relation identification while confirming that each relation information record includes said specified relation identification, the relation index further including a relation identification.

24. A system according to claim 23, further comprising:
a relation table for storing relation identifications each representing a relation between two items, and wherein said search means further comprises:
means for referring to said relation table in accordance with a specified relation to obtain said specified relation identification, when the search instruction includes only the specified relation.

* * * * *